(12) United States Patent
Nishida et al.

(10) Patent No.: US 10,960,933 B2
(45) Date of Patent: Mar. 30, 2021

(54) VEHICLE-BODY LOWER FACE STRUCTURE

(71) Applicant: MAZDA MOTOR CORPORATION, Hiroshima (JP)

(72) Inventors: Shuhei Nishida, Hiroshima (JP); Yoshiatsu Kuga, Hiroshima (JP); Masaru Chikita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 121 days.

(21) Appl. No.: 16/362,323

(22) Filed: Mar. 22, 2019

(65) Prior Publication Data

US 2019/0291789 A1    Sep. 26, 2019

(30) Foreign Application Priority Data

Mar. 23, 2018    (JP) .............................. JP2018-056450

(51) Int. Cl.
| | | |
|---|---|---|
| *B62D 25/20* | (2006.01) | |
| *B60G 21/05* | (2006.01) | |
| *B60G 7/00* | (2006.01) | |
| *B62D 25/16* | (2006.01) | |
| *B62D 35/02* | (2006.01) | |

(52) U.S. Cl.
CPC ......... *B62D 25/2036* (2013.01); *B60G 7/001* (2013.01); *B60G 21/051* (2013.01); *B62D 25/16* (2013.01); *B62D 35/02* (2013.01); *B60G 2200/21* (2013.01); *B60G 2204/4308* (2013.01)

(58) Field of Classification Search
CPC .... B62D 25/2036; B62D 25/16; B62D 35/02; B60G 7/001; B60G 21/051; B60G 2200/21; B60G 2204/4308
USPC ....................................................... 296/193.08
See application file for complete search history.

(56) References Cited

U.S. PATENT DOCUMENTS

2005/0264041 A1\* 12/2005 Sugihara ............ B62D 25/2036
  296/193.07
2016/0339970 A1\* 11/2016 Shibutake .......... B62D 25/2036

FOREIGN PATENT DOCUMENTS

| JP | 2012-148647 A | 8/2012 |
|---|---|---|
| JP | 2017-039354 A | 2/2017 |

\* cited by examiner

*Primary Examiner* — Joseph D. Pape
*Assistant Examiner* — Dana D Ivey
(74) *Attorney, Agent, or Firm* — Studebaker & Brackett PC

(57) ABSTRACT

A torsion beam type of rear suspension comprising a pair of right-and-left trailing arms and a torsion beam. A floor under cover for airflow straightening is attached to a portion of a vehicle body in front of the rear suspension so as to cover a vehicle-body lower face. A cover-support bracket is laid between a rear portion of a side sill and an inward side, in a vehicle width direction, of an arm pivot of the trail arm. A portion of the floor under cover which is positioned in the vicinity of its rear end is engaged with the cover-support bracket such that a rear end portion of the floor under cover is extended from an inward-side edge of a front portion of a rear wheel house to an inside of the rear wheel house.

2 Claims, 5 Drawing Sheets

VEHICLE-BODY LOWER FACE STRUCTURE

BACKGROUND OF THE INVENTION

The present invention relates to a vehicle-body lower face structure in which a torsion beam type of rear suspension comprising a pair of right-and-left trailing arms and a torsion beam connecting the trailing arms is provided and a floor under cover for airflow straightening is attached to a portion of a vehicle body in front of the rear suspension so as to cover a vehicle-body lower face.

In general, the floor under cover for airflow straightening is attached to the portion of the vehicle body in front of the rear suspension so as to cover the vehicle-body lower face, thereby straightening traveling air flowing below a vehicle floor.

In order to suppress disturbance of a vehicle rear airflow by preventing the traveling air flowing below the vehicle floor from flowing in a rear wheel house, it is preferable that a rear corner portion of the above-described floor under cover be configured to protrude into a space of the rear wheel house. Thereby, it is properly prevented that the vehicle rear airflow is disturbed by an airflow flowing out of the rear wheel house toward a vehicle side face.

However, a floor panel of the vehicle does not exist any more at a position near a rear end of the floor under cover and there is not any member for supporting the rear end of the floor under cover. Accordingly, it is a problem how the rearwardly-extended rear end of the floor under cover is supported.

Herein, Japanese Patent Laid-Open Publication No. 2012-148647 discloses a structure which comprises the trailing arm of the torsion beam type of rear suspension and the arm cover for airflow straightening which covers the lower portion of the trailing arm. Japanese Patent Laid-Open Publication No. 2017-39354 discloses a structure which comprises the torsion beam type of rear suspension and a rear under cover for airflow straightening which is provided at a rear vehicle-body lower face.

The above-described patent documents, however, do not refer to anything about how to support the rear end portion of the floor under cover.

SUMMARY OF THE INVENTION

Accordingly, an object of the present invention is to provide a vehicle-body lower face structure which can properly support the rear end portion of the floor under cover with high rigidity and also extend the rear end portion of the floor under cover into the rear wheel house at a properly low position, thereby preventing the traveling air flowing below the vehicle floor from flowing in the rear wheel house and finally suppressing disturbance of the vehicle rear airflow.

The present invention is a vehicle-body lower face structure which comprises a torsion beam type of rear suspension comprising a pair of right-and-left trailing arms and a torsion beam connecting the trailing arms, a floor under cover for airflow straightening attached to a portion of a vehicle body in front of the rear suspension so as to cover a vehicle-body lower face, and a cover-support bracket provided to be laid between a rear portion of a side sill and an inward side, in a vehicle width direction, of an arm pivot of the trail arm, wherein a portion of the floor under cover which is positioned in the vicinity of a rear end of the floor under cover is engaged with the cover-support bracket such that a rear end portion of the floor under cover is extended from an inward-side edge of a front portion of a rear wheel house to an inside of the rear wheel house.

According to the present invention, since the cover-support bracket is provided to be laid between the rear portion of the side sill and the inward side, in the vehicle width direction, of the arm pivot of the trail arm and the portion of the floor under cover positioned in the vicinity of the rear end of the floor under cover is engaged with the cover-support bracket, the rear end portion of the floor under cover can be extended from the inward-side edge of the front portion of the rear wheel house to the inside of the rear wheel house.

Thereby, the rear end portion of the floor under cover can be supported by the cover-support bracket with the high rigidity and also the rear end portion of the floor under cover can be extended into the rear wheel house at the properly low position. Consequently, the traveling air flowing below the vehicle floor is so prevented from flowing in the rear wheel house that disturbance of the vehicle rear airflow can be suppressed.

In an embodiment of the present invention, the cover-support bracket is fixed to a lower face of a side sill inner at an outward-side end portion, in the vehicle width direction, thereof and fixed to a pivot-support bracket which extends downwardly from a vehicle-body lower face and supports the arm pivot at an inward-side end portion, in the vehicle width direction, thereof.

According to this embodiment, the cover-support bracket is disposed right below the arm pivot of the trailing arm at a position where there exists originally no member to support the cover-support bracket, so that the portion of the floor under cover positioned in the vicinity of its rear end can be attached securely at the cover-support bracket (especially, see its cover attachment portion).

In another embodiment of the present invention, the portion of the floor under cover positioned in the vicinity of the rear end of the floor under cover is fixed to the cover-support bracket by an attaching member, a recess portion for accommodating a head of the attaching member is formed at the portion of the floor under cover, and a cover attachment portion of the cover-support bracket is configured such that the recess portion is spaced inwardly apart from a front inward-side edge of the rear wheel house.

According to this embodiment, while the traveling air flowing below the vehicle floor might be disturbed by the recess portion originally, this recess portion is spaced inwardly apart from the front inward-side edge of the rear wheel house, so that it can be properly suppressed that the disturbance of the traveling airflow flowing below the vehicle floor influences the rear wheel house.

Other features, aspects, and advantages of the present invention will become apparent from the following description which refers to the accompanying drawings.

DETAILED DESCRIPTION OF THE INVENTION

Figure 2:
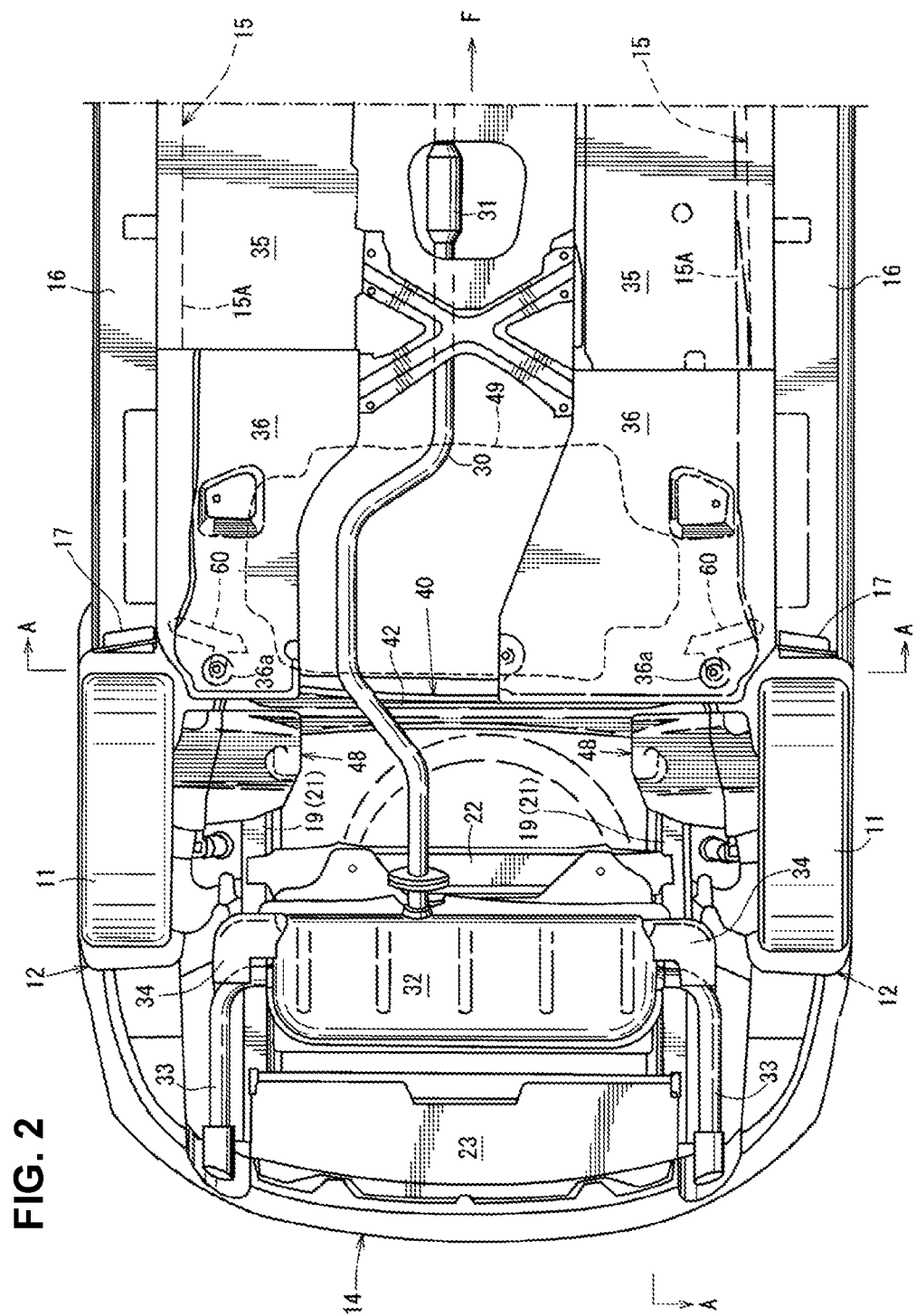
FIG. 2 is a bottom view of a major part of FIG. 1.
Figure 3:
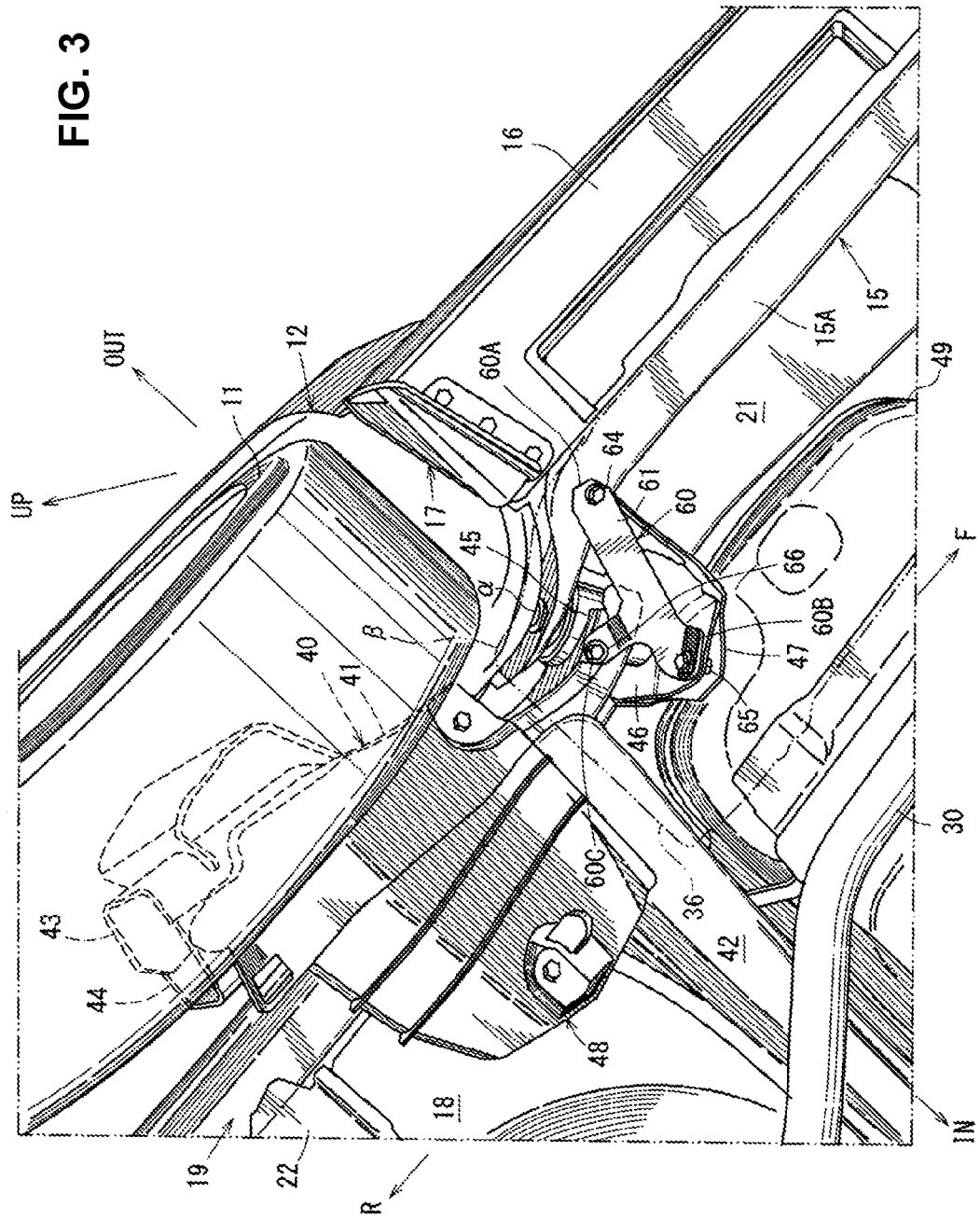
FIG. 3 is a perspective view of the vehicle-body lower face structure, when viewed from an downward side of the vehicle.
Figure 4:
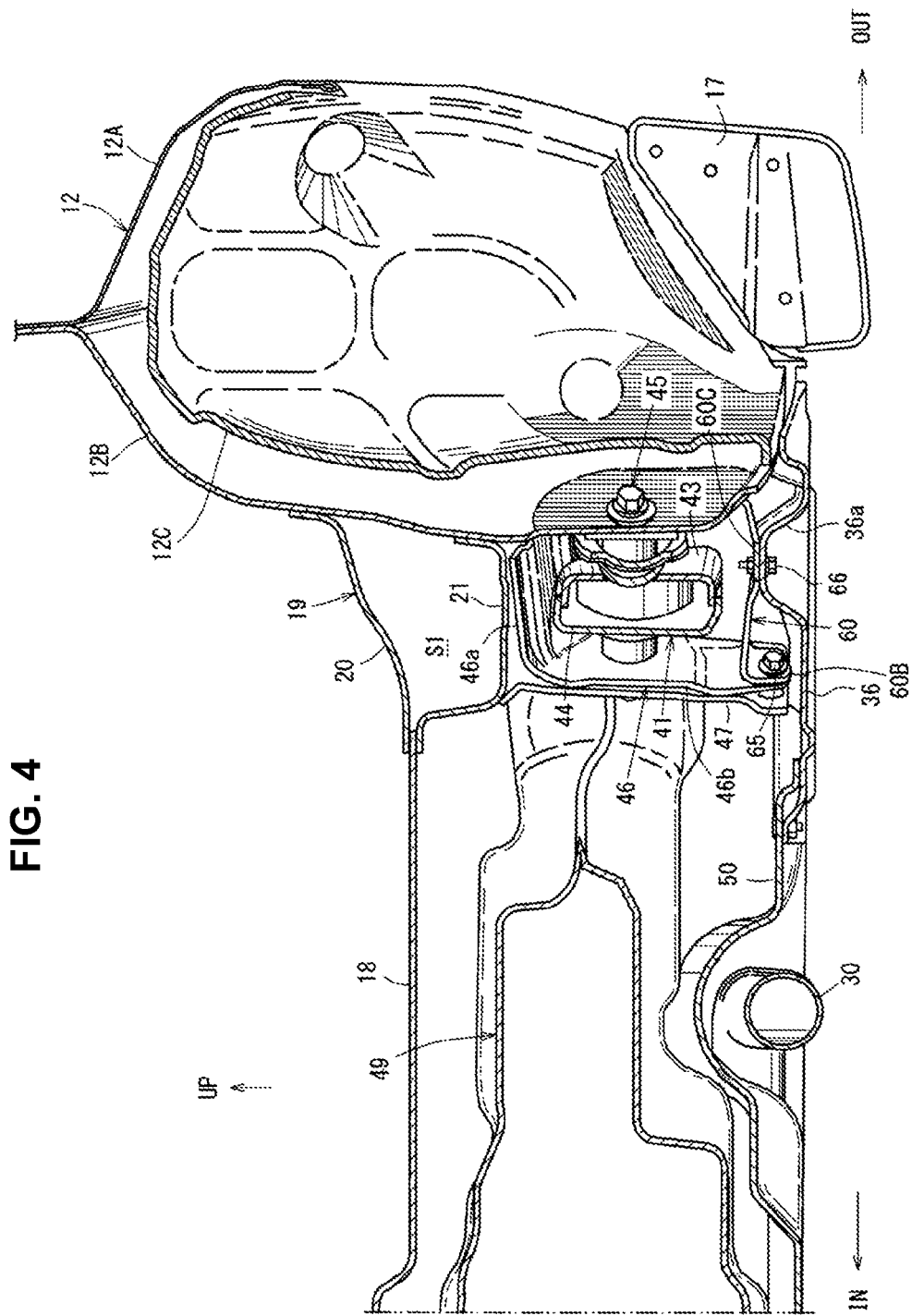
FIG. 4 is a sectional view of a vehicle right-side major part, taken along line A-A of FIG. 2.
Figure 5:
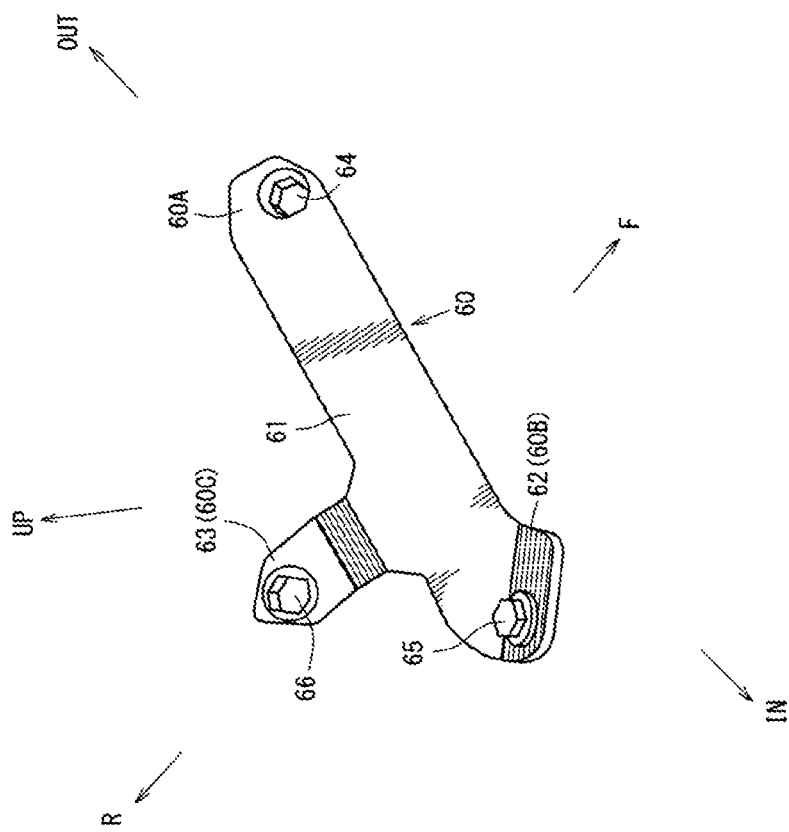
FIG. 5 is an enlarged view of a cover-support bracket.

Hereafter, an embodiment of the present invention will be specifically described referring to the drawings. The drawings show a vehicle-body lower face structure, and FIG. 1 is a side view of a vehicle which is provided with the vehicle-body lower face structure, FIG. 2 is a bottom view of a major part of FIG. 1, FIG. 3 is a perspective view of the vehicle-body lower face structure, when viewed from an downward side of the vehicle, FIG. 4 is a sectional view of a vehicle right-side major part, taken along line A-A of FIG. 2, and FIG. 5 is an enlarged view of a cover-support bracket.

Figure 1:
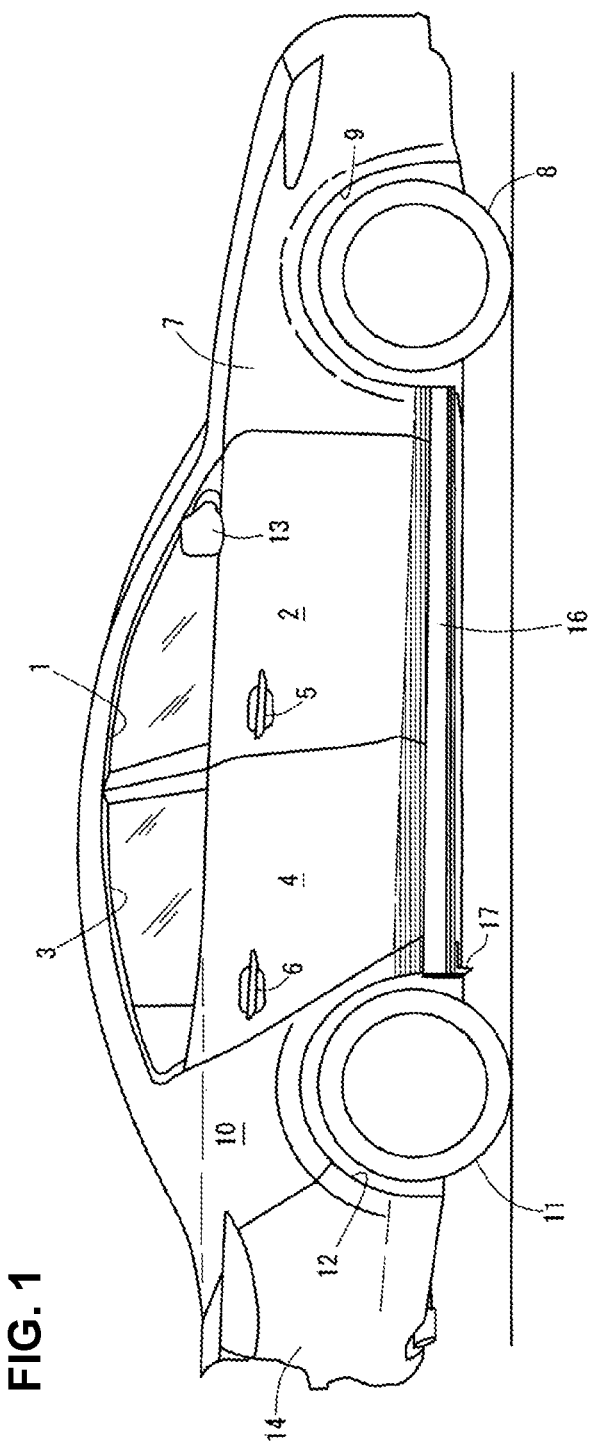
FIG. 1 is a side view of a vehicle which is provided with a vehicle-body lower face structure of the present invention.

As shown in FIG. 1, at a side portion of a vehicle body are provided a front door 2 as a side door which is configured to open or close a front door opening 1 which is formed at a vehicle front portion and a rear door 4 as another side door which is configured to open or close a rear door opening 3 which is formed at a vehicle rear portion. The front door 2 is equipped with a door outer handle 5, and the rear door 4 is equipped with another door outer handle 6 similarly.

As shown in FIG. 1, a front fender panel 7 which covers a side of an engine room is provided in front of the front door 2, and a front wheel house 9 is integrally formed at a lower portion of the front fender panel 7 at a position corresponding to a front wheel 8.

As shown in FIG. 1, a rear fender panel 10 which covers a side of a baggage compartment is provided in back of the rear door 4, and a rear wheel house 12 is integrally formed at a lower portion of the rear fender panel 10 at a position corresponding to a rear wheel 11. In FIG. 1, reference character 13 denotes a door mirror, and reference character 14 denotes a rear bumper face which is configured to extend rearwardly, going around a vehicle side portion.

As shown in FIG. 2, a pair of right-and-left side sills 15 which extend in a vehicle longitudinal direction at a lower portion of a cabin at a position between a lower end portion of a rear edge of the front wheel house 9 and a lower end portion of a front edge of the rear wheel house 12 are provided. The side sill 15 is a vehicle-body reinforcing member having a side-sill closed cross section, which is formed by fixedly joining a side sill outer and a side sill inner 15a (see FIG. 3) and extends in the vehicle longitudinal direction.

As shown in FIG. 2, a pair of garnishes 16, 16 are attached to the above-described pair of right-and-left side sills 15 such that each garnish 16 covers each side sill 15 over a range from the front wheel house 9 to the rear wheel house 12.

A tire deflector 17 is provided at a rear end portion of the garnish 16 such that the tire deflector 17 faces the lower end portion of the front edge of the rear wheel house 12. This tire deflector 17 is configured to deflect a side-face airflow flowing at a vehicle-body side portion such that the side-face airflow is turned toward an outward side, in the vehicle width direction, so as not to flow into the rear wheel house 12 and adheres to an outer face of a tire wheel of the rear wheel 12.

As shown in FIG. 4, a floor panel 18 which forms respective bottom faces of the cabin and the baggage compartment is configured such that a front floor panel, a rear seat pan, and a rear floor panel are continuous in the vehicle longitudinal direction.

As shown in FIG. 2, the side sill 15 which extends in the vehicle longitudinal direction from the above-described front floor panel to a middle position, in a longitudinal direction, of the rear seat pan is fixedly joined to the floor panel 18.

Further, as shown in FIGS. 2 through 4, a rear side frame 19 which extends in the vehicle longitudinal direction from a middle position, in a longitudinal direction, of the above-described rear seat pan to a rear end of the rear floor panel is provided. As shown in FIG. 4, the rear side frame 19 comprises a rear side frame upper 20 and a rear side frame lower 21, and a rear-side-frame closed cross section S1 which extends in the vehicle longitudinal direction is formed between the rear side frame upper 20 and the rear side frame lower 21.

As shown in FIG. 2, a rea cross member 22 which extends in the vehicle width direction is provided to be laid between the right-and-left rear side frames 19, 19 at a longitudinal position in back of a central portion of the rear wheel 11, and the right-and-left rear side frame lowers 21, 21 are interconnected by this rear cross member 22.

Meanwhile, as shown in FIG. 2, an exhaust pipe 30 to guide exhaust gas rearwardly is provided at a tunnel portion below the vehicle floor. This exhaust pipe 30 is provided with a catalyst convertor 31, a silencer 32 is connected to a rear end portion of the exhaust pipe 30 which extends to a position behind the rear cross member 22, and a pair of tail pipes 33, 33 are attached to right-and-left both sides of the silencer 32. This tail pipe 33 is configured in an L shape such that it extends outwardly in the vehicle width direction and then extends rearwardly.

A cover for airflow straightening 34 is provided to cover between an outward side, in the vehicle width direction, of a front portion of the silencer 32 and a corner portion of the tail pipe 33 from below. Further, a rear under cover 23 which has a flat airflow-straightening face is provided behind the silencer 32.

As shown in FIG. 2, floor under covers for airflow straightening 35, 36 which cover another portion of the vehicle-body lower face than the tunnel portion are provided. Each of the floor under covers 35, 36 has a flat airflow-straightening face at its bottom face.

The front-and-rear floor under covers 35, 36 are configured to be continuous to each other in the vehicle longitudinal direction. As shown in FIG. 3, a torsion beam type of rear suspension 40 which suspends the rear wheel 11 is provided.

As shown in FIGS. 2 and 3, the rear suspension 40 comprises a pair of right-and-left trailing arms 41, 41 (see FIG. 3) and a torsion beam 42 (torsional bar spring) which extends in the vehicle width direction and interconnects the trailing arms 41, 41.

As shown in FIG. 3, the above-described trailing arm 41 is the one which comprises an outside arm member 43 and an inside arm member 44 which are fixedly joined and extends substantially in the vehicle longitudinal direction.

As shown in FIGS. 3 and 4, a front end portion of the trailing arm 41 is pivotally supported at a vehicle body via an arm pivot 45 and an arm bracket 46 as a pivot-support bracket.

Herein, as shown in FIG. 4, the above-described rear wheel house 12 is formed by a wheel house outer 12A and a wheel house inner 12B which are fixedly joined, and a wheel house mudguard 12C is attached to a side face of the rear wheel house 12 which faces the rear wheel 11.

Further, the above-described arm bracket 46 comprises, as shown in FIG. 4, an upper piece portion 46a which extends roughly horizontally and a vertical wall portion 46b which extends downwardly from an inward end, in the vehicle width direction, of the upper piece portion 46a, which are integrally joined.

As shown in FIG. 4, the above-described upper piece portion 46a is fixedly joined to a lower face of the rear side frame lower 21. Further, another bracket 47 is provided adjacently to the vertical wall portion 46b of the arm bracket 46.

The above-described arm pivot 45 is provided between a lower portion of the wheel house inner 12B of the rear wheel house 12 and the vertical wall portion 46b of the arm bracket 46, which forms a front-end-side base end portion of the trailing arm 41.

As shown in FIGS. 2 and 3, an arm cover for airflow straightening 48 is provided at a lower portion of the trailing arm 41. As shown in FIGS. 2, 3 and 4, a fuel tank 49 is provided below a floor portion of the rear seat pan of the floor panel 18. As shown in FIG. 4, an insulator for heat-damage prevention 50 is arranged between the exhaust pipe 30 and the fuel tank 49.

As shown in FIGS. 2, 3 and 4, the floor under cover for airflow straightening 36 is configured to cover a vehicle-body lower face at a position in front of the rear suspension 40.

As shown in FIGS. 3 and 4, a cover-support bracket 60 is provided to be laid between a rear portion of the side sill 15 and an inward side, in the vehicle width direction, of the arm pivot 45 of the trail arm 41, wherein a portion of the floor under cover 36 which is positioned in the vicinity of a rear end of the floor under cover 36 (see a point formed at a recess portion 36a which will be described later) is fixedly engaged with the cover-support bracket 60 such that a rear end portion (particularly, a rear-end corner portion β shown in FIG. 3) of the floor under cover 36 is extended from an inward-side edge α (see FIG. 3) of a front portion of the rear wheel house 12 to an inside of the rear wheel house 12. The above-described configuration is for the purpose of preventing the traveling air flowing below the vehicle floor from flowing in the rear wheel house.

Thereby, the rear end portion of the floor under cover 36 is extended from the inward-side edge α of the front portion of the rear wheel house 12 to the inside of the rear wheel house 12 and supported by the cover-support bracket 60 with the high rigidity, and also the rear end portion of the floor under cover 36 is extended into the rear wheel house 12 at a properly low position so as to prevent the traveling air flowing below the vehicle floor from flowing in the rear wheel house 12, thereby suppressing disturbance of the vehicle rear airflow.

As shown in the enlarged view of FIG. 5, the above-described cover-support bracket 60 comprises a bracket body 61 which extends substantially in the vehicle width direction, an outward-side end portion 60A which is positioned on an outward side, in the vehicle width direction, of the cover-support bracket 60, a bent portion 62 which is configured to be bent downwardly from an inward side, in the vehicle width direction, of the bracket body 61, an inward-side end portion 60B which is formed at the bent portion 62, a protrusion portion 63 which protrudes rearwardly from the bracket body 61, and a cover attachment portion 60C which is formed at the protrusion portion 63, which are integrally formed in a roughly T shape.

Further, as shown in FIG. 3, the cover-support bracket 60 is fixed to a lower face of the side sill inner 15A by using an attaching member 64, such as a bolt and nut, at its outward-side end portion 60A and fixed to the arm bracket 46 as the pivot-support bracket which extends downwardly from the vehicle-body lower face and supports the arm pivot 45 by using an attaching member 65, such as a bolt and nut, at its inward-side end portion 60B, and the portion of the floor under cover 36 which is positioned in the vicinity of its rear end is fixed to the cover attachment portion 60C by using an attaching member 66, such as a bolt and nut.

The above-described cover-support bracket 60 is disposed right below the arm pivot 45 of the trailing arm 41 at a position where there exists originally no member to support the cover-support bracket 60 so that the portion of the floor under cover 36 positioned in the vicinity of its rear end is attached securely at the cover-support bracket 60.

As shown in FIGS. 3, 4 and 5, the above-described portion of the floor under cover 36 positioned in the vicinity of its rear end is fixed to the cover attachment portion 60C of the cover-support bracket 60 by the attaching member 66, such as the bolt and nut, and the recess portion 36a for accommodating a head of the attaching member 66 is formed at the above-described portion of the floor under cover 36 positioned in the vicinity of its rear end.

The cover attachment portion 60C of the cover-support bracket 60 is configured such that the recess portion 36a is spaced inwardly apart from the front inward-side edge α of the rear wheel house 12 (see FIG. 3).

That is, while the traveling air flowing below the vehicle floor might be disturbed by the recess portion 36a originally, this recess portion 36a is configured to be spaced inwardly apart from the front inward-side edge α of the rear wheel house 12 so that it is suppressed that the disturbance of the traveling airflow flowing below the vehicle floor influences the rear wheel house 12.

In the figures, an arrow F shows a vehicle forward side, an arrow R shows a vehicle rearward side, an arrow IN shows an inward side in the vehicle width direction, an arrow OUT shows an outward side in the vehicle width direction, and an arrow UP shows a vehicle upward side.

As described above, the vehicle-body lower face structure of the above-described embodiment comprises the torsion beam type of rear suspension 40 comprising the pair of right-and-left trailing arms 41 and the torsion beam 42 which connects the trailing arms 41, the floor under cover for airflow straightening 36 which is attached to the portion of the vehicle body in front of the rear suspension 40 so as to cover the vehicle-body lower face, and the cover-support bracket 60 which is provided to be laid between the rear portion of the side sill 15 and the inward side, in the vehicle width direction, of the arm pivot 45 of the trail arm 41, wherein the portion of the floor under cover 36 which is positioned in the vicinity of the rear end of the floor under cover 36 is engaged with the cover-support bracket 60 such that the rear end portion of the floor under cover 36 is extended from the inward-side edge α of the front portion of the rear wheel house 12 to the inside of the rear wheel house 12 (see FIGS. 2-5).

According to the present structure, since the cover-support bracket 60 is provided to be laid between the rear portion of the side sill 15 and the inward side, in the vehicle width direction, of the arm pivot 45 of the trail arm 41 and the portion of the floor under cover 36 positioned in the vicinity of the rear end of the floor under cover 36 is engaged with the cover-support bracket 36, the rear end portion of the floor under cover 36 can be extended from the inward-side edge α of the front portion of the rear wheel house 12 to the inside of the rear wheel house 12.

Thereby, the rear end portion of the floor under cover 36 can be supported by the cover-support bracket 60 with the high rigidity and also the rear end portion of the floor under cover 36 can be extended into the rear wheel house 12 at the properly low position. Consequently, the traveling air flowing below the vehicle floor is so prevented from flowing in the rear wheel house 12 that disturbance of the vehicle rear airflow can be properly suppressed.

Further, in the embodiment of the present invention, the cover-support bracket 60 is fixed to the lower face of the side sill inner 15A at its outward-side end portion 60A and fixed to the pivot-support bracket (see the arm bracket 46) which extends downwardly from the vehicle-body lower face and supports the arm pivot 45 at its inward-side end portion 60B (see FIGS. 3-5).

According to this structure, the cover-support bracket 60 is disposed right below the arm pivot 45 of the trailing arm 41 at the position where there exists originally no member to support the cover-support bracket 60, so that the portion of the floor under cover 36 positioned in the vicinity of its rear end can be attached securely at the cover-support bracket 60 (especially, see its cover attachment portion 60C).

Moreover, in the embodiment of the present invention, the portion of the floor under cover 36 positioned in the vicinity of the rear end of the floor under cover 36 is fixed to the cover-support bracket 60 by the attaching member 66, the recess portion 36a for accommodating the head of the attaching member 66 is formed at the above-described portion of the floor under cover 36, and the cover attachment portion 60C of the cover-support bracket 60 is configured such that the recess portion 36a is spaced inwardly apart from the front inward-side edge α of the rear wheel house 12 (see FIGS. 2-4).

According to this structure, while the traveling air flowing below the vehicle floor might be disturbed by the recess portion 36a originally, this recess portion 36a is spaced inwardly apart from the front inward-side edge α of the rear wheel house 12, so that it can be properly suppressed that the disturbance of the traveling airflow flowing below the vehicle floor influences the rear wheel house 12.

In correspondence of the present invention to the above-described embodiment, the pivot support bracket of the present invention corresponds to the arm bracket 46 of the embodiment. However, the present invention should not be limited to the above-described embodiment only.

What is claimed is:

1. A vehicle-body lower face structure, comprising:
a torsion beam type of rear suspension comprising a pair of right-and-left trailing arms and a torsion beam connecting the trailing arms;
a floor under cover for airflow straightening attached to a portion of a vehicle body in front of the rear suspension so as to cover a vehicle-body lower face; and
a cover-support bracket provided to be laid between a rear portion of a side sill and an inward side, in a vehicle width direction, of an arm pivot of the trail arm,
wherein a portion of said floor under cover which is positioned in the vicinity of a rear end of the floor under cover is engaged with said cover-support bracket such that a rear end portion of the floor under cover is extended from an inward-side edge of a front portion of a rear wheel house to an inside of the rear wheel house, and
said cover-support bracket is fixed to a lower face of a side sill inner at an outward-side end portion, in the vehicle width direction, thereof and fixed to a pivot-support bracket which extends downwardly a vehicle-body lower face and supports said arm pivot at an inward-side end portion, in the vehicle width direction, thereof.

2. The vehicle-body lower face structure of claim 1, wherein said portion of the floor under cover positioned in the vicinity of the rear end of the floor under cover is fixed to said cover-support bracket by an attaching member, a recess portion for accommodating a head of said attaching member is formed at said portion of the floor under cover, and a cover attachment portion of the cover-support bracket is configured such that said recess portion is spaced inwardly apart from a front inward-side edge of said rear wheel house.

* * * * *